June 28, 1927.

G. FAUSER 1,633,729

AUTOMOBILE BODY CONSTRUCTION

Filed March 26. 1924      4 Sheets-Sheet 1

Inventor
George Fauser
By Stuart C Barnes
Attorney

June 28, 1927.

G. FAUSER 1,633,729

AUTOMOBILE BODY CONSTRUCTION

Filed March 26, 1924     4 Sheets-Sheet 2

Inventor
George Fauser
By Stuart C. Barnes
Attorney

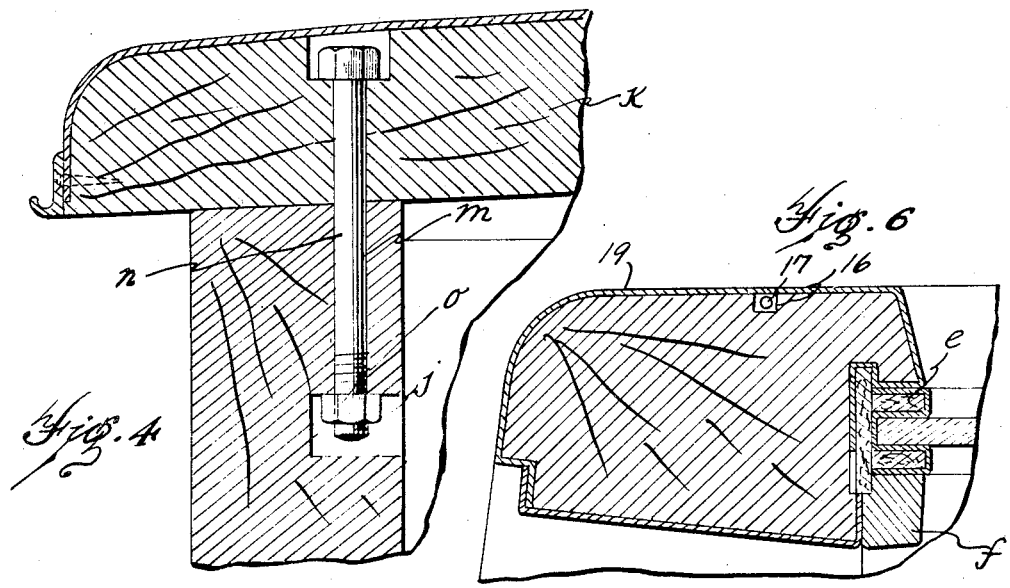
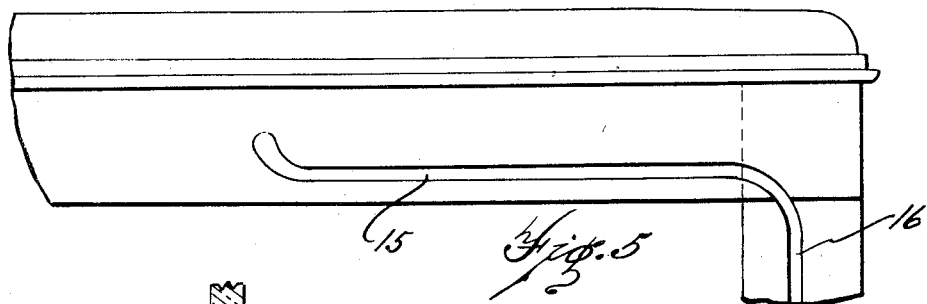
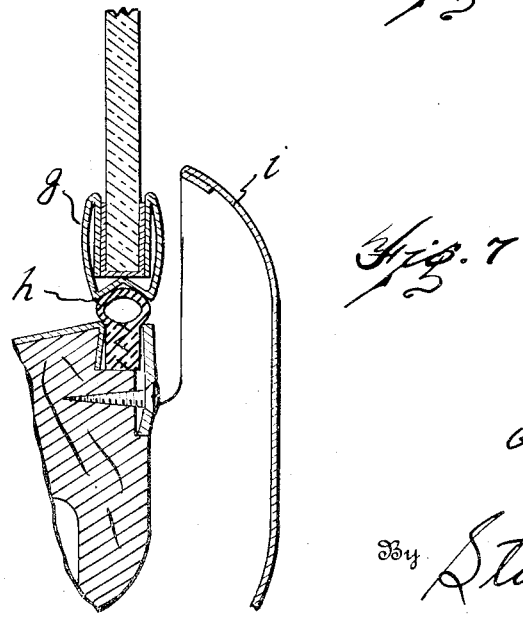

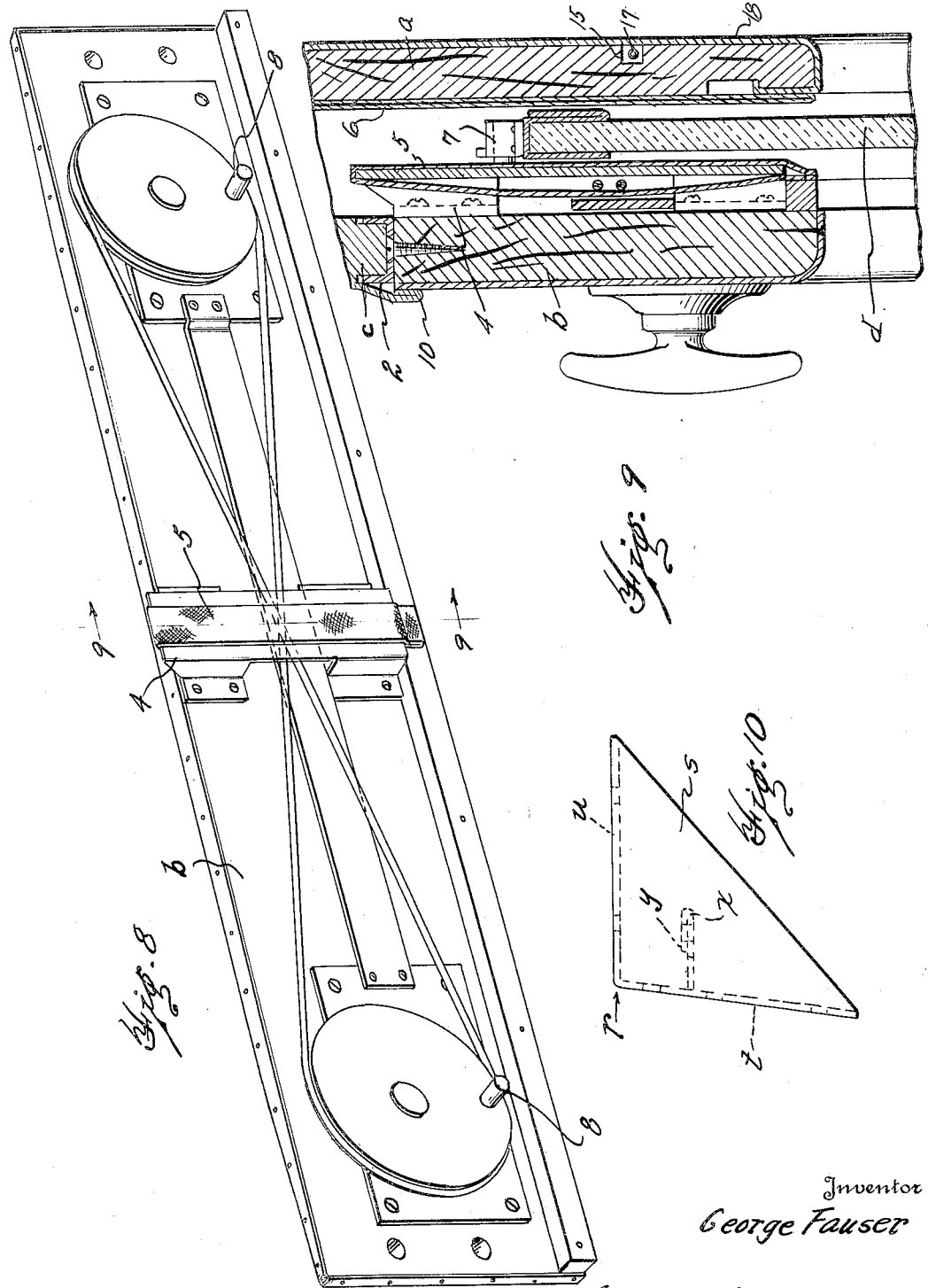

Patented June 28, 1927.

1,633,729

UNITED STATES PATENT OFFICE.

GEORGE FAUSER, OF DETROIT, MICHIGAN, ASSIGNOR, BY MESNE ASSIGNMENTS, TO GENERAL MOTORS CORPORATION, OF DETROIT, MICHIGAN, A CORPORATION OF DELAWARE.

AUTOMOBILE BODY CONSTRUCTION.

Application filed March 26, 1924. Serial No. 701,908.

This invention relates to body construction and especially to the windshield construction in a closed body. It is the object of the invention to provide an improved header construction for the reception of a sliding windshield panel. The header chamber is so constructed that the inside board may be removed taking with it the window regulator, if such a unit is used.

The invention also includes an improved fastening connection for anchoring the roof rails to the windshield pillars.

Another feature is the arrangement of the automatic windshield wiper and the means for concealing the suction tube leading thereto.

In the drawings:

Fig. 4 is a section taken on the line 4—4 of Fig. 2, showing how the roof side rails are bolted to the windshield pillars.

Fig. 5 shows the grooves made in the outside header board and the windshield pillar before the metal sheathing is placed thereon, and which is arranged to take the windshield wiper tube.

Fig. 6 is a section taken on the line 6—6 of Fig. 1.

Fig. 7 is a vertical cross section through the windshield sill.

Fig. 8 is a perspective of the removable inside header board showing the same removed together with the windshield regulator unit.

Fig. 9 is a cross section taken on the line 9—9 of Fig. 8, showing the header board assembled in the body structure.

Fig. 10 is a detail top plan view of the corner fixture.

The windshield frame comprises an outer header board $a$, a removable inner header board $b$ and a stationary inner header board $c$. These header boards define the header chamber. This header chamber is adapted to permit the windshield panel $d$ to be raised and lowered therein about 4 inches, although the exact distance is immaterial. The windshield panel $d$ preferably has its side edges sashless and the same runs in the felted channel $e$. This felted channel is anchored in the windshield post by suitable rabbeting of the post and the molding strip $f$.

The bottom of this windshield panel is enclosed in a special form of channel strip $g$ which is the subject matter of a separate application, Patent No. 1,576,150 and which need not be here given in detail. This panel closes down upon the rubber weather strip $h$ to form a weathertight fit at the bottom. $i$ designates a ventilator for turning the air passing in under the windshield when raised down under the instrument board for the purpose of avoiding a direct draft and for cooling the feet. This construction is described and claimed in application Patent No. 1,604,103.

The present application is limited to the body construction which includes the means for anchoring the side roof rails to the tops of the windshield pillars. The windshield pillars are recessed on their rear sides as at $j$. The roof rail $k$ is bored and counterbored and the end of the winshield pillar is bored as at $m$. A large bolt $n$ may be dropped down through the hole in the side layer and through the hole in the top of the windshield pillar. A nut $o$ may be inserted through the opening $j$ at the back of the windshield post and held with a suitable tool. The head of the bolt may be turned down from the top with a socket wrench and the two parts tightly drawn together. This forms a very secure and non-rattling joint between the top of the windshield post and the side rear of the roof.

Figure 3:
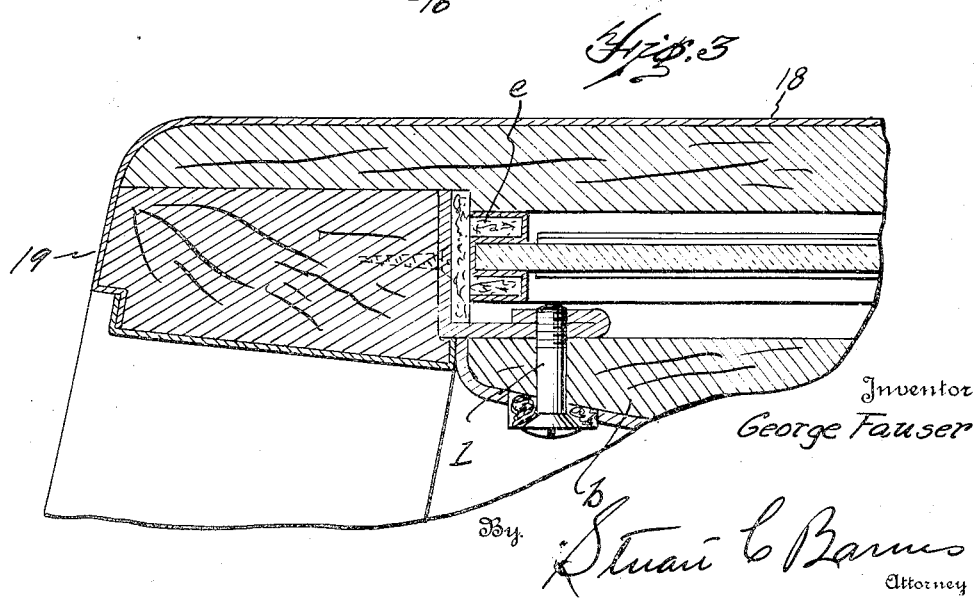
Fig. 3 is a horizontal cross section taken through the left hand windshield post.

The joint is further reinforced by the special fixture designated $r$ which I will call a corner fixture. This corner fixture is a stamping and comprises a triangular gusset web $s$, a downturned flange $t$ adapted to be secured to the roof side rail by screws and a second downturned flange $u$ adapted to be secured to the front header board $a$. This corner fixture is provided with a downwardly extending web or angle $x$ one portion of this angle is looped back as at $y$ so as to give thickness and strength and permit the tapped holes $z$. This permits the removable header board $b$ to be secured thereto by machine screws 1 as shown in Fig. 3. By taking out the four machine screws the entire board can be dropped down. The clip 2

Figure 1:
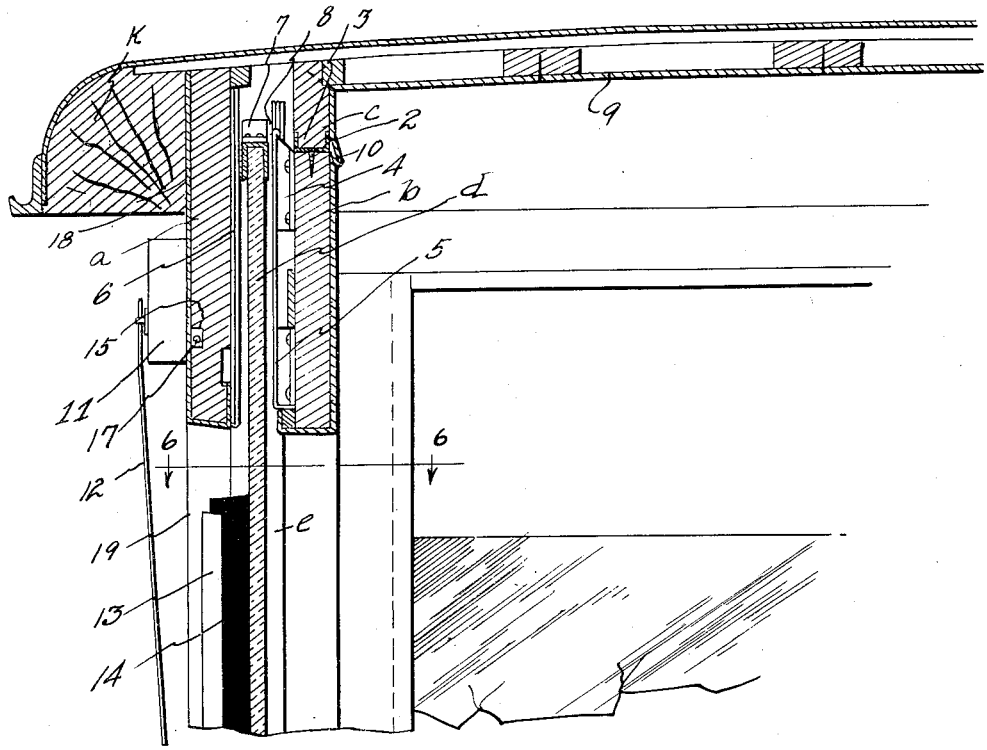
Fig. 1 is a vertical cross section through the windshield of a closed body.
Figure 1:
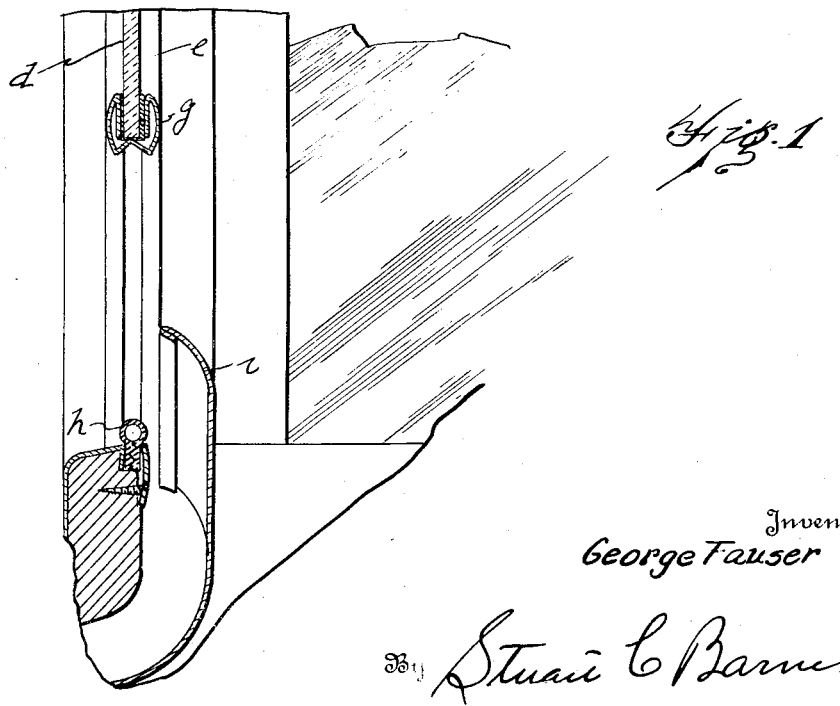
Figure 2:
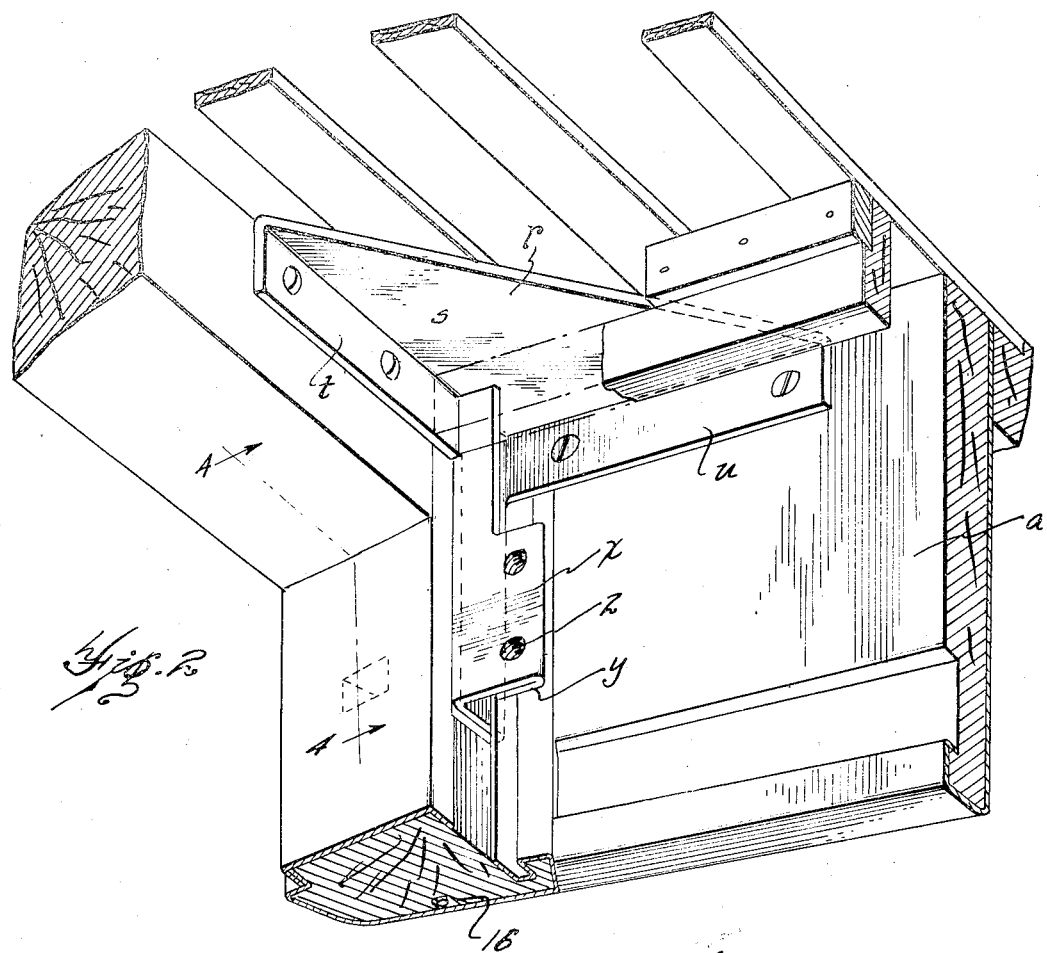
Fig. 2 is a perspective view of the windshield header showing the trimming and the inside header board removed.

(Fig. 1) fits over a tongue 3 at the center of the upper header board c for the purpose of steadying the removable header board at the center; likewise the inside face of the removable header board b supports the bracket 4 over which is looped a strip of plush 5 to steady the wide windshield panel at the center and prevent the same whipping back and forth due to the vibration of the car. The inside of the front header board has also two thicknesses of plush 6 nailed to the same at the center to cushion the panel at this point.

Now, referring to Fig. 8, it will be seen that the window regulator is carried as a unit on the inside face of the removable header board b. The regulator that happens to be here shown is made the subject matter of a copending application, Serial No. 702,753, but obviously the special construction of the regulator is immaterial. Suffice it to say that a pair of pulley wheels are connected by a crossed web which is anchored on each pulley wheel. Each pulley wheel is provided with a crank pin adapted to removably fit in the loops 7 fastened to the top of the windshield panel. When the machine screws 1 are taken out the header board b may be slipped off the tongue 3 at the center of the header board c, the crank pins 8 will readily withdraw from the loops 7 of the channel frame bar. This will not only remove the regulator as a unit, but it will also detach the regulator from the windshield panel. This may be desirable for the purpose of getting into the header chamber for one purpose or another or it may be desirable for the purpose of repairing, lubricating or examining the regulator.

It will be noticed that the trimming 9 that is secured to the cross slats of the roof turns at the header board and drops down as at 10 over the joint between the two inner header boards so that this is really concealed.

An ordinary automatic windshield wiper would be out of the question here for the reason that the so-called vacuum type ordinarily has the casing, whether it be a segment or a cylinder, on the inside of the car. The wiper shaft ordinarily runs through the windshield frame and the wiper is carried on the outside of the shield. I have so reorganized the wiper that the casing 11 here is carried on the outside of the shield; the wiper arm 12 projects down on the outside of the shields and carries the cleaner bar 13 provided with the usual rubber strip 14. I groove the outside header board as at 15 and also the windshield post as at 16. In this may be the vacuum tube 17 which connects with the manifold of the motor, not shown. This tube may be either rubber, copper or other material. After it has been incorporated in these grooves the metal sheathing 18 is applied to the header board and to the windshield post as at 19, and completely covers and conceals the tube.

What I claim is:

1. In a body construction, the combination of a windshield frame including a sill, pillars, and a header, the latter provided with a header well having a removable header board, a windshield panel arranged to slide up and down in the pillars and partially withdrawable into the header chamber, and means supported on the inside of the header well for raising and lowering the panel, and detachable from the panel and assembled as a unit through the opening of the header well covered by the said header board.

2. In an automobile body construction, a windshield frame comprising pillars, sill and a header forming a header chamber and provided with a removable inner header board, means for removably fastening the inner header board in place, a windshield panel slidable up and down in the pillars and into the header chamber, and means supported on the inside of the removable header board for raising and lowering the panel.

3. In automobile body construction, a windshield frame including a sill, two pillars and a header forming a header chamber with a removable header board, a window regulator assembled and located as a unit on the inside of said chamber through the opening covered by the removable header board and a windshield panel slidable up and down in the pillars and into the header chamber upon the operation of the window regulator.

4. In automobile body construction, the combination of a windshield frame including a sill, two pillars and a header provided with a header chamber having a removable header board, means for removably supporting the header board in place, a window regulator supported as a unit on the inside of the removable header board and arranged to detachably engage the top of the windshield panel and the said windshield panel slidable in the pillars and raised and lowered partially into the chamber between said window regulator.

5. In windshield body construction, the combination of a roof rail, a windshield pillar and a header board and a corner fixture anchored to all three members and a removable header board detachably supported by said fixture.

6. In automobile body construction, the combination of a roof rail, a windshield pillar, an outer header board, a corner fixture provided with turned over flanges secured to the forward header board and the roof rail and an angle web secured to the windshield pillar, and a removable header board which can be detachably secured to the angle member.

7. In automobile body construction, the combination of a roof rail, a windshield pillar secured thereto, a forward header board, a fixture provided with a triangular web with downturned flanges respectively secured to the roof rail and the rail of the forward header board and provided with downturning web portions, and a removable header board that can be secured to the downrunning web portion.

8. In an automobile body construction, a windshield comprising pillars, sill and a header forming a header chamber, and provided with removable inner header board, means for removably fastening the inner header board in place, a windshield panel movable from opened to closed position between said pillars and a window regulator supported on the inside of the removable header board for operating the said movable panel.

9. In automobile body construction, the combination of a windshield frame including a sill, pillars and a header provided with a chamber, a windshield panel guided in the pillars and arranged to be lowered partially into the chamber and a bracket secured to one of the header boards and provided with a portion arranged to engage near the center of the windshield panel to prevent whipping.

10. In automobile body construction, the combination of a windshield frame including a sill, pillars and a header provided with a chamber, a windshield panel guided in the pillars and arranged to be lowered partially into the chamber, and a bracket secured to one of the header boards and provided with a portion arranged to engage near the center of the windshield panel and provided with a cushioning portion adapted to engage near the center of the windshield panel to prevent whipping.

11. In automobile body construction, a windshield frame comprising pillars, sills and a header forming a header well including a removable trimmed inner header board, the said header provided with fastening means whereby the upholstered inner header board may be put in place or removed as a unit without disturbing the upholstering, a windshield panel slidable up and down in the pillars and into the header chamber, and means supported on the inside of the header chamber for raising and lowering said panel.

12. In an automobile body construction, the combination of a windshield frame, including a sill, two pillars and a header forming a header chamber having a removable header board, means for removably supporting the header board in place, a windshield panel movable between said pillars in opened and closed position, and vice versa, and a window regulator for controlling such movable windshield panel located and concealed in said header chamber and accessible by removal of said header board.

In testimony whereof I affix my signature.

GEORGE FAUSER.